US008160922B2

(12) United States Patent
Postrel

(10) Patent No.: US 8,160,922 B2
(45) Date of Patent: Apr. 17, 2012

(54) METHOD AND SYSTEM FOR MAKING DONATIONS TO CHARITABLE ENTITIES

(75) Inventor: Richard Postrel, Miami Beach, FL (US)

(73) Assignee: Signature Systems, LLC., Miami Beach, FL (US)

( * ) Notice: Subject to any disclaimer, the term of this patent is extended or adjusted under 35 U.S.C. 154(b) by 1209 days.

(21) Appl. No.: 11/231,357

(22) Filed: Sep. 20, 2005

(65) Prior Publication Data

US 2006/0122874 A1    Jun. 8, 2006

Related U.S. Application Data

(63) Continuation-in-part of application No. 11/128,116, filed on May 11, 2005, now Pat. No. 7,096,190, which is a continuation of application No. 10/601,317, filed on Jun. 20, 2003, now Pat. No. 6,947,898, which is a continuation of application No. 09/602,222, filed on Jun. 23, 2000, now Pat. No. 6,594,640.

(60) Provisional application No. 60/140,603, filed on Jun. 23, 1999, provisional application No. 60/611,855, filed on Sep. 20, 2004, provisional application No. 60/658,549, filed on Mar. 4, 2005.

(51) Int. Cl.
*G06Q 20/00* (2012.01)
(52) U.S. Cl. ............... 705/14.19; 705/53; 705/58
(58) Field of Classification Search ............... 705/14.19, 705/17, 19, 53, 58
See application file for complete search history.

(56) References Cited

U.S. PATENT DOCUMENTS

| | | | |
|---|---|---|---|
| 5,466,919 A * | 11/1995 | Hovakimian | 705/17 |
| 5,592,376 A | 1/1997 | Hodroff | |
| 5,621,640 A * | 4/1997 | Burke | 705/14.17 |
| 5,642,485 A * | 6/1997 | Deaton et al. | 705/14.25 |
| 5,659,165 A | 8/1997 | Jennings et al. | |
| 5,687,323 A | 11/1997 | Hodroff | |
| 5,689,100 A * | 11/1997 | Carrithers et al. | 235/380 |
| 5,734,838 A * | 3/1998 | Robinson et al. | 705/14.26 |
| 5,787,404 A * | 7/1998 | Fernandez-Holmann | 705/35 |
| 6,070,147 A * | 5/2000 | Harms et al. | 705/14.25 |
| 6,088,682 A * | 7/2000 | Burke | 705/17 |
| 6,631,358 B1 * | 10/2003 | Ogilvie | 705/39 |
| 6,721,743 B1 | 4/2004 | Sakakibara | |
| 6,947,898 B2 | 9/2005 | Postrel | |
| 7,014,104 B2 * | 3/2006 | MacFarlane et al. | 235/379 |
| 2001/0054003 A1 * | 12/2001 | Chien et al. | 705/14 |

(Continued)

OTHER PUBLICATIONS

Vesdia Launches PLCC Loyalty Program for NonProfits, Mar. 23, 2005 Colloquy Breaking News.

(Continued)

*Primary Examiner* — Thomas Dixon
*Assistant Examiner* — Gerald Vizvary
(74) *Attorney, Agent, or Firm* — Barkume & Associates, P.C.

(57) ABSTRACT

A method and system for making a donation to a third party, wherein a user executes a purchase transaction using a card linked to a reward point account If a user donation is desired, then the user's reward point account is decreased and corresponding value is transferred to a designated third party as a donation. In another aspect referred to as "topping off", the donation amount is the difference between the tender amount and the purchase amount, and is transferred to a designated third party as a donation to the third party in lieu of providing change for the transaction back to the user.

21 Claims, 2 Drawing Sheets

U.S. PATENT DOCUMENTS

| | | | |
|---|---|---|---|
| 2002/0029190 A1 | 3/2002 | Gutierrez-Sheris | |
| 2002/0174063 A1* | 11/2002 | Major | 705/39 |
| 2003/0065572 A1* | 4/2003 | McNee et al. | 705/26 |
| 2003/0225689 A1* | 12/2003 | MacFarlane et al. | 705/39 |
| 2004/0182922 A1* | 9/2004 | Talarico | 235/380 |
| 2004/0249752 A1* | 12/2004 | Prato et al. | 705/41 |
| 2005/0021353 A1 | 1/2005 | Aviles et al. | |
| 2005/0021363 A1* | 1/2005 | Stimson et al. | 705/1 |
| 2005/0043992 A1 | 2/2005 | Cohagan et al. | |
| 2006/0089874 A1* | 4/2006 | Newman et al. | 705/14 |

OTHER PUBLICATIONS

Loyalty Cards: When Clients Spend, Nonprofits Shall Receive; Aug. 2, 2004; American Banker-Bond Buyer.

COMMUNITYsmart is a card-based loyalty program that delivers, May 13, 2005 email description.

Safeway Launches Loyalty-Based Charity Donations, Mar. 6, 2006 email.

Asami, S. "Loyalty Card Utilized as a Marketing Tool in Europe and North America", Card Wave, by C. Media Co., Japan, vol. 10, No. 10, Sep. 10, 1997, pp. 14-20. English Translation.

Wada, F. "Customer Loyalty Programs in America: Latin Pass & Frequency Marketing Inc.", Card Wave, by C. Media Co., Japan, Vo. 11, No. 2, Jan. 10, 1998, pp. 50-52. English Translation.

Kim, W.J. and D.H. Kim "A Method for Exchanging Bonus Points", English Translation of Korean Patent Publication 1999-0078768, May 11, 1999.

Sakakibara, "Method and System for Managing Point, Central Unit and Recording Medium", Machine-generated English translation of Japanese Patent publication JP2001-273453; Oct. 5, 2001, http://www19.ipdl.ncipi.go.jp/PA1/result/detail/main/wAAAZHaGlcDA413273453P1.htm.

Chang, H.J. and K.H Kim "Mileage Point Integration System Based on Internet", English Translation of Korean Patent Publication TUK 2000-0012702, Mar. 6, 2000.

ClickRewards—Member Agreement http://web.archive.org/web/19980516234621/www.clickrewards.com/NSU_b.html.

* cited by examiner

METHOD AND SYSTEM FOR MAKING DONATIONS TO CHARITABLE ENTITIES

CROSS-REFERENCE TO RELATED APPLICATIONS

This application is a continuation-in-part application of application Ser. No. 11/128,116, filed on May 11, 2005 now U.S. Pat. No. 7,096,190, which is a continuation application of application Ser. No. 10/601,317, filed Jun. 20, 2003, now U.S. Pat. No. 6,947,898 issued Sep. 20, 2005, which is a continuation application of application Ser. No. 09/602,222, filed Jun. 23, 2000, now U.S. Pat. No. 6,593,640 issued Jul. 15, 2003, which is based on and claims filing priority of U.S. provisional patent application Ser. No. 60/140,603, filed on Jun. 23, 1999. This application is also based on and claims filing priority of U.S. provisional patent application Ser. No. 60/611,855, filed on Sep. 20, 2004 and U.S. provisional patent application Ser. No. 60/658,549, filed on Mar. 4, 2005.

BACKGROUND OF THE INVENTION

The present invention relates to electronic trading, exchange, liquidation and bartering systems that allow users to donate reward points and other value such as cash, credit, goods and services to charitable organizations and individuals. The reward points that may be donated are for example those already accumulated in airline frequent flyer programs, hotel reward programs, and credit card issuer reward programs. This would allow users to use their frequent flyer (or frequent car rental, frequent dining, etc.) points for making a donation to a desired charity.

In the prior art, it is often desired to be able to make a charitable contribution or donation to a charity. Problems often arise that inhibit or curtail the desires of the donor in this situation. One such problem is ease of making the donation. Often, it is required for a donor to mail in a check to a charity such as the Red Cross, or to make telephone call, etc. Another problem in the donations field is that donors are concerned that the intended charity may not be a charity in fact, but may only have a charitable sounding name. Thus, although the intent is to donate money to a charitable cause, the money may end up in the hands of an unscrupulous recipient with no intentions on distributing the funds to those in need.

Another problem that arise in the donations field is that individuals may desire to have funds earmarked for certain groups or subgroups of a charity, but have no way of informing the charity of their intentions or ensuring that the funds are distributed as they desire. For example, one may donate money to the American Red Cross Hurricane Katrina Fund, but may in fact want the money to be earmarked for disabled orphaned children that are homeless as a result of that hurricane.

These and other problems are addressed by the present invention as fully described herein.

SUMMARY OF THE INVENTION

The present invention provides the ability for users to donate funds (in one or more various forms such as reward points, frequent flyer miles, cash, credit, goods, services and/or combinations of same) to one or more designated recipients such as a service organization, charity, or a specific subgroup or member of any such organization. In one aspect of the invention as described herein, a point of sale terminal is adapted to enable donations to a charity or individual for example as part of a purchase transaction. Similarly, one may be able to make a charitable donation using the present invention via a web site, which may or may not be integrated with an e-commerce website similar to a point of sale paradigm.

The present invention contemplates that a donor may make donations using cash from an account, credit from a credit card account, cash tendered at the point of sale, and/or reward points that have been earned from previous transactions and/or or the current transaction being executed. The donor may direct the donations to recipients in one of various manners as described further herein.

Thus, the present invention is a method for making a donation to a third party, wherein a user executes a purchase transaction using a card linked to a user account at a financial institution, the user account storing at least one indicia of value associated with the user. The user is queried via a point of donation device if a donation is desired to be made by the user to a third party. If the user indicates that a donation is to be made to a third party, then value is transferred from the user account to a designated third party as a donation to the third party.

In one aspect, the user account stores reward points previously accumulated by the user as a result of previous transactions, and the step of transferring value from the user account to a designated third party as a donation to the third party includes reducing the number of reward points in the user account and transferring a corresponding value to an account associated with the third party. The value transferred to an account associated with the third party may include a monetary value that is deposited to a monetary account associated with the third party, and/or reward points that are deposited to a reward account associated with the third party.

The reward points previously accumulated by the user as a result of previous transactions may include reward points that are earned by the user as a result of executing previous purchase transactions associated with the card linked to the user account and/or reward points that are aggregated by the user from one or more different reward point accounts.

The user account may be a credit account associated with the user, and the financial institution may make a payment of a donation amount to the third party on behalf of the user and charge the donation amount to the credit account associated with the user. The user account may be a debit account associated with the user, and the financial institution may make a payment of a donation amount to the third party on behalf of the user and charge the donation amount to the debit account (e.g. checking account) associated with the user.

The point of donation device may be a point of sale device associated with the purchase transaction executed by the user, a web site associated with the purchase transaction executed by the user, or a telephone set associated with the purchase transaction executed by the user. The point of donation device may query the user for an amount to be donated and the user enters the amount to be donated into the point of donation device, or the amount to be donated may be a default amount previously indicated by the user. In this case, the user may have the option of overriding the default amount and entering a different amount for that particular transaction into the point of donation device.

The point of donation device may query the user for an identification of the third party to which the donation will be made, and then the user enters the identification of the third party to which the donation will be made into the point of donation device. The identification of the third party may be a default identification previously indicated by the user, in which case the user has the option of overriding the default identification and entering a different identification for that particular transaction into the point of donation device.

In another aspect of the invention referred to herein as "topping off", a user executes a purchase transaction, the amount of the transaction corresponding to a purchase amount. The user tenders payment for the purchase transaction in a tender amount, the tender amount being greater than the purchase amount. The user is queried if a donation is desired to be made by the user to a third party for a donation amount, wherein the donation amount is the difference between the ender amount and the purchase amount. If the user indicates that a donation is to be made to a third party, then the donation amount is transferred to a designated third party as a donation to the third party in lieu of providing change for the transaction back to the user.

In a similar manner, another "topping off" embodiment occurs under this invention when a user executing a purchase transaction, with the amount of the transaction corresponding to a purchase amount. The user is queried if a donation is desired to be made by the user to a third party for a donation amount, wherein the donation amount is the difference between the purchase amount and the purchase amount rounded off to a greater amount. If the user indicates that a donation is to be made to a third party, then the user tenders payment for the purchase transaction in a tender amount equal to the purchase amount and the donation amount. The donation amount is then transferred to a designated third party as a donation to the third party in lieu of providing change for the transaction back to the user.

As further described herein, a member of the system of the present invention may be one of the following types: a donor, an individual recipient, an organizational recipient, a funds issuer, a funds processor, or a point of donation provider.

DETAILED DESCRIPTION OF THE PREFERRED EMBODIMENT

Figure 1:
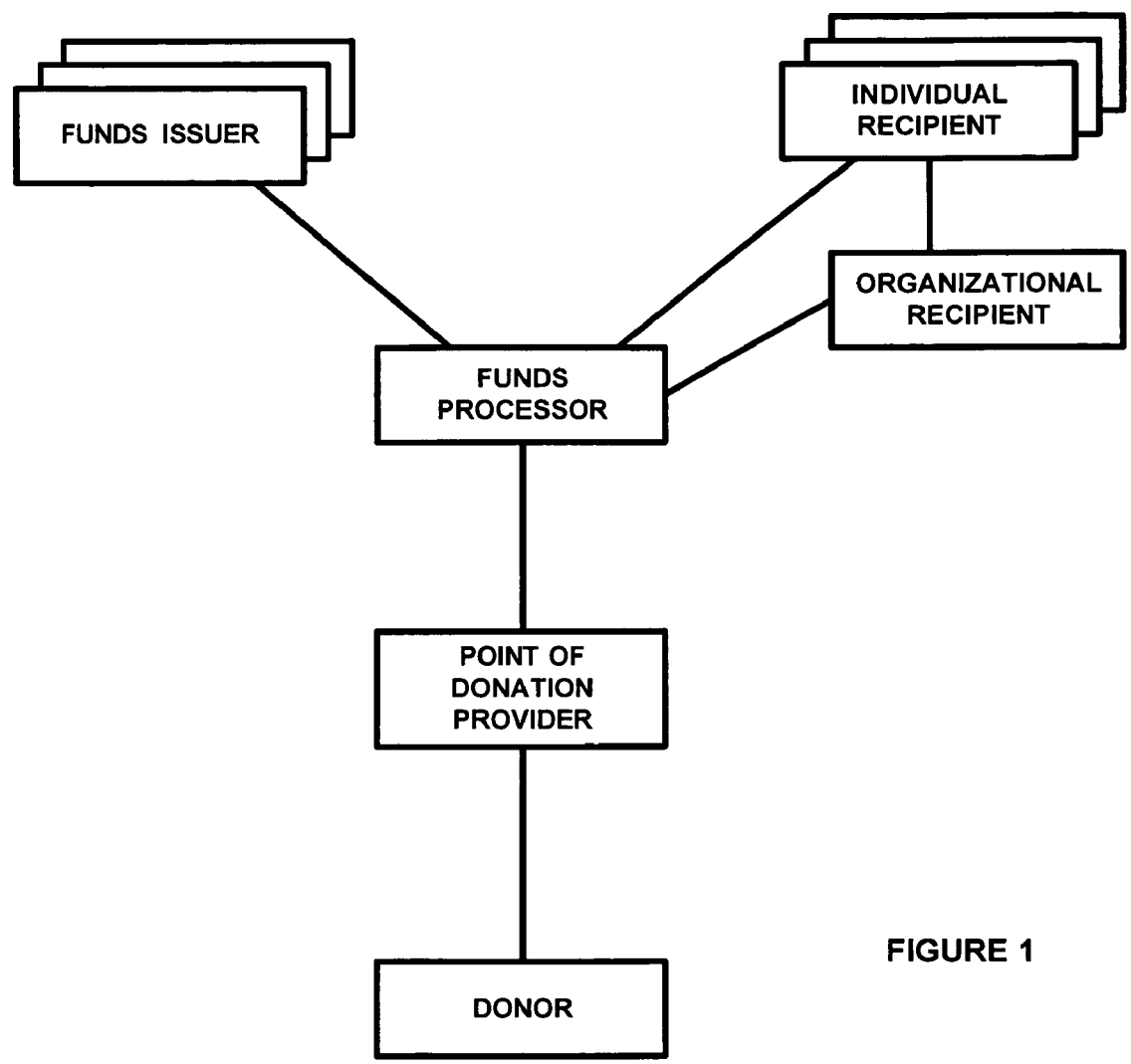
FIG. 1 is a block diagram of the invention.

Under this invention, which is shown in block diagram form in FIG. 1, a funds processor provides the central management service for the system. The funds processor receives instructions from a point of donation provider, which may for example be a physical point of sale device, a web site, a telephone-based customer service representative, and the like. A donor, which is typically an individual such as a consumer, will interact with a point of donation provider to request a donation to be made to an intended recipient, which may be an organizational recipient (such as the USO) or to a specific individual recipient (such as a certain relative of the donor). The funds processor interacts with the point of donation provider to cause a funds issuer to issue funds that are then provided to the intended donation recipient. The funds issuer and the donor have an existing contractual relationship such that the donor will reimburse the funds issuer, or the funds issuer will use funds that it already holds on behalf of the donor.

In a preferred embodiment to be discussed in detail below, the present invention is implemented within an existing credit card network such as the VISA credit card network. In this embodiment, the funds issuer may be an entity such as an issuing bank, which has issued a VISA credit card to the donor. The donor will thus have a credit based account with the issuing bank, and he may also have a reward points account held by the funds issuer. As known in the prior art, issuing banks may award reward points to its customers based on expenditures made with the credit card. For example, a customer that charges $2,000 on his credit card will have 2,000 points entered into his reward account with the issuing bank. The customer may accumulate reward points and ultimately redeem some or all of his reward points in exchange for a product or service. For example, a customer may be able to exchange 5,000 reward points for a DVD player, or 35,000 points for an airline ticket.

Reward points systems such as those provided by a credit card issuing bank are referred to as funded systems, wherein the issuing bank will set aside the par value of the points awarded for subsequent redemption by the consumer. Thus, when the issuing bank awards 5,000 points, and the par value is 0.01 (one cent), then the issuing bank will have a liability of $50 to the consumer and will set aside that $50 to cover consumer's redemption of the points. For example, a consumer may elect to redeem his 5,000 reward points and the issuing bank will use the $50 to make the purchase designated by the consumer (e.g. via a related web site), it may give cash back to the consumer, etc. In any event, when the consumer has a reward point account with an issuing bank, he effectively has a credit with that bank for the par value of the total number of points in the account.

In the credit card network embodiment, the point of donation provider may be a merchant using a point of sale device such as a POS terminal, cash register or the like. The funds processor is an entity that manages the credit card transactions between the merchant's POS device, the issuing bank, and another entity known as an acquiring bank. In a general credit card transaction between the consumer and the merchant, the credit card is swiped into the POS terminal and a request is made by the POS terminal to the funds processor to approve and execute the credit card transaction. The funds processor will interact with the issuing bank to determine if the consumer has adequate credit to fund the requested transaction. Assuming this is the case, then the funds processor will approve the transaction and the POS terminal will be informed of this approval. The funds processor will instruct the acquiring bank to pay the merchant the purchase price, and the issuing bank will be instructed to make payment to the acquiring bank. The issuing bank will then issue a bill to the consumer (usually at the end of a billing cycle such as monthly) that will list all of his purchases and demand payment. This process, which is well known in the art, is the backbone for most credit card transactions that occur in networks such as VISA and MASTERCARD.

The present invention will leverage the existing credit card network to provide for donations to be made to intended recipients in one or more of various forms. In one embodiment, a donation may be made in the form of reward points by the donor to the intended recipient. The POS terminal functions as a point of donation provider (POD), and will provide instructions to the funds processor to execute the donation transaction. First, the POD will provide a user interface that allows a donor/consumer to request a donation of reward points to be made. A donor approaches the POD (perhaps ancillary to making a purchase at the merchant) and swipes his credit card. The POD processes the magnetic stripe information as it would in a credit card transaction, and sends the appropriate identification information (e.g. issuing bank, account number) over the credit card network to the funds processor (again, as it would in a normal credit card transaction). The funds processor will contact the funds issuer (the issuing bank) and request the funds issuer to look up and return the number of reward points held in the donor's reward point account by the funds issuer (as explained above). The funds processor will then return the reward point information to the POD device, which will display a message to the donor in the following manner:

"You have 6,510 reward points available for donation. Enter the amount of points to be donated".

The donor may then enter the desired number of reward points to be donated, which will be transmitted back to the funds processor. The funds processor will contact the funds issuer and inform it that the reward points will be redeemed. The funds issuer will then decrease the donor's reward point account by the designated number of reward points and provide payment to the funds processor, either in real time or in a batch mode at the end of a periodic cycle (e.g. daily, weekly, monthly, etc.) The funds processor will then make payment of the appropriate amount to the intended recipient, which is either an organizational recipient or an individual recipient as explained below.

The funds processor may charge a transaction fee to the donor, which may be paid in the form of a credit card charge on the card used to execute the transaction, or it may keep a percentage of the amount designated for donation, etc.

As indicated above, funds may be donated to an organizational recipient, such as the USO, or to an individual recipient, such as a relative of the donor stationed in the armed services abroad. The donor may indicate the intended recipient in one of several ways. In one embodiment, the donor has a profile previously configured and stored in a database with the funds processor or the funds issuer. For example, in the event that the donation service of the present invention is sponsored and implemented by the funds processor, then the profile may be stored with the funds processor, and may include various information such as a default recipient, a default donation amount, an indication that funds may be donated periodically or on demand, etc. The donor profile may provide as follows:

| | |
|---|---|
| DEFAULT RECIPIENT: | PVT. JOHN SMITH |
| | ARMED SERVICES ID 123456789 |
| DEFAULT AMOUNT: | 1,000 POINTS |
| DEAFULT DONATION PERIOD: | MONTHLY X . |
| | WEEKLY ___ |
| | WHEN AVAILABLE ___ |
| | ON DEMAND ___ |

This profile indicates that the funds processor will request a donation on a monthly basis of 1,000 reward points (a value of $10 when the par value is 0.01 per point) made to Pvt. John Smith. If the profile indicates that the donation is to be made "When Available", then the donation will be made shortly after the reward account reaches at least 1,000 points. In this event, the funds processor will periodically poll the funds issuer to ascertain when the reward account of the donor has reached at least 1,000 points and execute the donation transaction accordingly. If the profile indicates the "On Demand" option, then the 1,000 point donation will only be made when demanded by the donor via the POD device.

If a default amount is not indicated, then the funds processor will request the donor to enter the donation amount during the transaction, as indicated above. In addition, the donor may modify the default amount at any time desired.

In addition to indicating a default recipient in a profile, the system allows the donor to indicate any recipient at the time of the donation transaction. This may be done to override or supplement the default recipient. Thus, the donor may execute a donation transaction and override the profile by donating 5,000 points to a different recipient as desired.

As indicated, the recipient may be an organization rather than an individual. For example, the donor may desire for the donation to be made to a charitable organization such as the USO. In this event, the USO may disperse the funds as with a donation made to it under prior art practices.

Donations may be made under this system without requiring a donor profile to be in the system. In this scenario, since no default parameters are entered in the system, the donor will be presented with all donation options (amount, recipient) on the POD interface. This is especially useful in obtaining donations from users that are not already registered with the system. For example, a consumer may approach a POS device (integrated with POD functionality under this invention) at a merchant intending to use his credit card (issued by the issuing bank) to make a purchase. When the purchase transaction approval request is transmitted by the POS/POD to the funds processor, the funds processor will detect that the credit card used by the consumer was issued by an issuing bank that is also funds issuer under this invention. The funds processor will query the issuing bank/funds issuer to ascertain the number of reward points that consumer may have in his or her reward point account. The number of reward points is looked up by the issuing bank and returned to the funds processor, which will then transmit the number of reward points back to the POS/POD device for display on the touchscreen to the consumer with a query as follows:

"You have 5,500 reward points in you account with Acme Bank. Would you like to donate some or all of these points to a charitable organization? _____ Yes _____ No"

If the consumer indicates "No", then the purchase transaction is executed as usual. If, however, the consumer has been enticed to make such a donation, then the reward point donation transaction is executed as described above. A series of queries will be displayed that will determine the number of points to be donated as well as a recipient organization. A list of potential recipients may be displayed as follows:

Please choose a recipient of your reward points:
USO _____
American Red Cross _____
Armed Forces _____
Cancer Research _____

Figure 2:
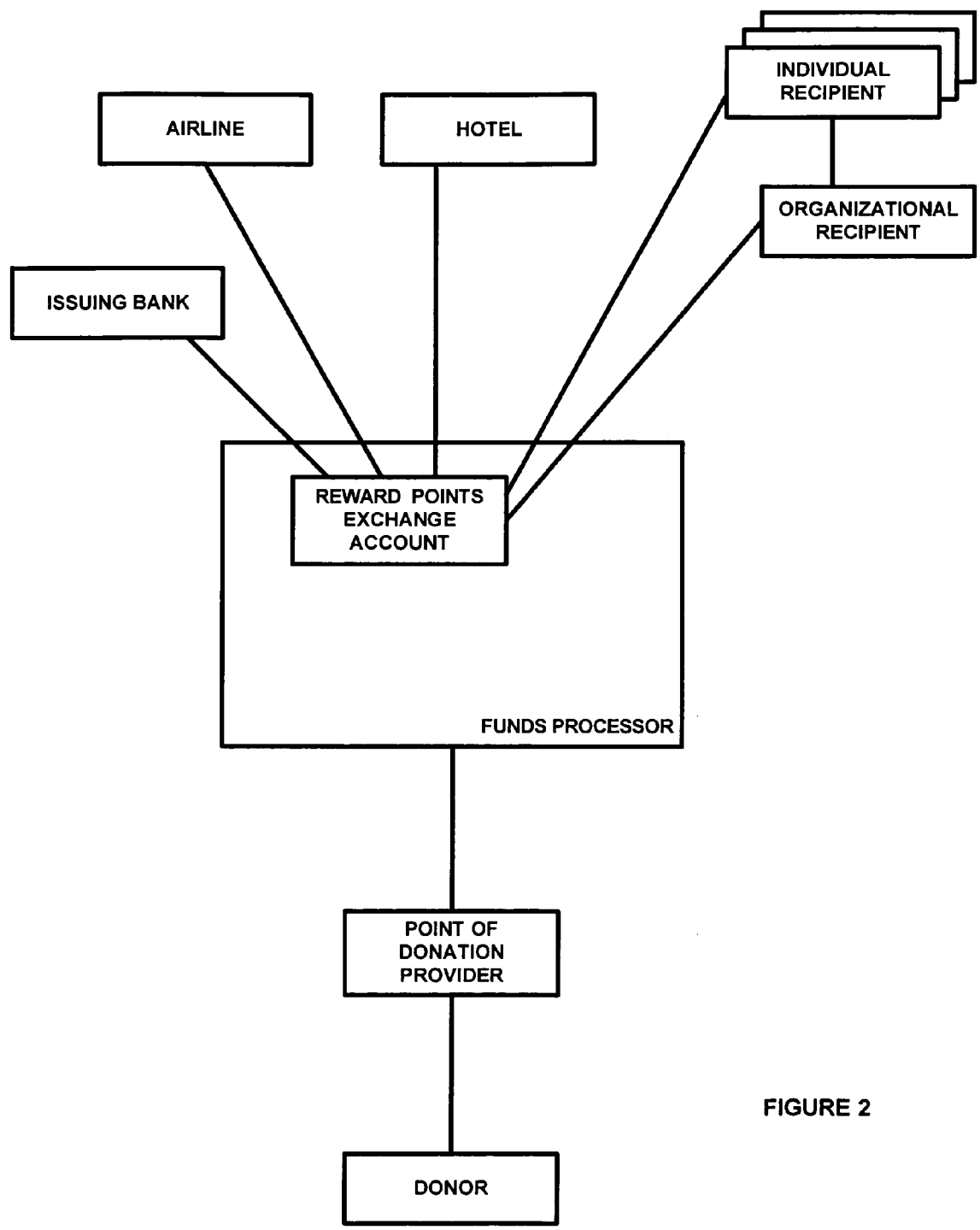
FIG. 2 is a further detailed block diagram of the invention.

In addition to donating reward points from a single account held by the donor as described above, it is possible under this invention to implement a reward point aggregation strategy as described in U.S. Pat. No. 6,594,640, invented and owned by the same inventor as the present application. The '640 patent, which is incorporated by reference herein, incorporates a system and method for consumers to exchange reward points from various reward point accounts, held by different reward points issuers such as an airline, a hotel, a credit card issuer, etc., into a central reward exchange account, such that the total value of the exchanged reward points may be advantageously redeemed for products or services. In this invention, as shown in FIG. 2, the funds processor may act as a reward point exchange entity and interact with a plurality of reward point issuing entities (e.g. an issuing bank, an airline, and a hotel) in order to aggregate reward point value into an account held on behalf of the consumer/donor, generally at the request of the consumer/donor. In this case, the donor may be shown the total number of aggregated reward points held by the funds processor (in total exchange points or aggregated value), and/or the donor may be shown the individual reward totals from each issuing entity (the issuing bank, the airline, and the hotel, for example). The donor may opt to exchange reward points via the POS/POD device at the time of the donation transaction, and then make the desired donation, or the donor may choose to use only reward points that have already been aggregated into his reward account previously.

In some cases, the donor may use reward points that are earned as a result of a current transaction. For example, when a consumer/donor executes a purchase transaction at the merchant's POS/POD device, he may be provided with the following option:

"You have earned 500 reward points from this transaction. Would you like to donate them to a charitable organization?" _____ Yes _____ No"

If the donor chooses "Yes", then the reward points issuing entity—which may be the merchant itself, or which may be the issuing bank, or which may be a combination of both such entities—will provide the donation amount equivalent to the reward amount to the designated organization or individual recipient as described above, rather than crediting the reward points to the donor's reward account as in the prior art.

In another embodiment, the donor may make a donation to the charitable organization in the form of consideration other than (or in combination with) reward points. For example, the following query may be displayed at the POS/POD terminal: "Would you like to make a $5.00 donation to the USO?" _____ Yes _____ No If the donor chooses yes, then the POS/POD device will add the designated amount to the total purchase price. The donation amount will be arranged to be conveyed to the recipient by the funds processor, and the purchase price will be paid as in the usual prior art manner.

In addition to the POS/POD terminal device described with respect to the above embodiment, the present invention allows donations to be made as described using other devices such as a personal computer interconnected over the Internet. In this case, a donor would load a web page from a web server associated with the funds processor. After log in, the web page would be a portal for the donor to perform various tasks as follows:

View individual reward account totals
View aggregated reward exchange account totals
Execute reward point exchanges into his reward point exchange account
View/update his donation profile or other user profile information
View donation activity
Print records of donation activities for tax purposes
Execute donation transactions Another embodiment envisioned by this invention is the use of a touch tone telephone to access account information and execute exchanges and donations as described above, in a manner well known in the art of telephone control systems. Likewise, kiosk stations such as ATM machines may be used to perform the inventions described herein.

In a further embodiment, a customer is able to make a donation of value at the point of sale such as a POS terminal or web site that is equivalent to the difference between the amount of money being spent and the next rounded off denomination of money, such that the purchase amount is "topped off" with a donation to a selected charity. For example, a customer may spend $8.67 at a store POS terminal, and then elect to donate 0.33 to make his total expenditure $9.00 even, or $1.33 to make his total expenditure $10.00 even, etc. This may apply to points exchange and redemption transactions as well as cash or credit transactions.

Thus, the example above applies to a cash transaction scenario and a credit transaction scenario. In a points transaction scenario, a customer elects to use reward points in exchange for an item at a point of sale. For example, the customer may desire to pay for a music CD that costs $9.21 by redeeming an equivalent value of reward points. If the reward points have a redemption value of 1 cent per point, then the customer would have to redeem 921 points to obtain the CD. The customer would also be given the option to donate an additional 79 points to even off his purchase amount so that he will redeem exactly 1000 points, 921 of which will be applied to the purchase of the CD and 79 of which will be donated to an applicable charity. The next rounded off increment may be changed as desired by the system operator or the customer making the donation.

Donations made under this invention may be tracked by one or more of the various entities involved in the donation (e.g. the funds processor). As such, milestones that are reached may be memorialized for the donor. For example, a certificate may be awarded when a donor reaches a 10,000 point donation milestone, or a $500 donation milestone, etc. This is a further incentive for donors to make donations under the present invention.

It is also noted that in addition to redeeming points for the donation whereby cash or cash equivalent is transferred to a donee as described above, the present invention also contemplates the direct transference of reward points from the account of a donor into an account on behalf of the donee. As such, the donee may then aggregate or redeem the donated reward points in the same manner as if he/she had earned them initially. Thus, for example, the donor would be given the option to donate 500 reward points earned in a transaction (or previously earned or aggregated) directly to a donee, whereby that donee would have an account opened in the amount of 500 reward points (or would have an existing account increased by the donated 500 reward points). The donee could later redeem those points as desired.

In a further embodiment of this invention, a geocentric focus is implemented whereby a community of geographically-defined donors may make donations as described herein to one or more of a group of predefined geocentrically based recipients, all of which may be managed and/or sponsored by an entity in that geographic region. For example, a community bank may sponsor a donation program wherein persons in that community are enabled to make donations of reward points, cash and the like to one or more donees in that community. This enables charitable contributions to be made at the local (or regional) level without requiring customers to have to write checks for small amounts such as $0.25 as in the prior art.

Reward (or loyalty) points aggregation is described in full detail in U.S. Pat. No. 6,594,640, owned by the assignee of the present invention, which is incorporated by reference herein. As described in the '640 patent, and with reference to FIG. 4 therein, a plurality of reward server computers 10, 12, 14, a trading server 20, a merchant computer 30 and a user computer 40 are shown in communication with a network 40. The network may comprise any type of communication process where computers may contact each other. The present invention will be described with respect to an Internet-based network where the reward server computer 10 is associated with an airline frequent flyer program. Any type of reward server may also be used in this system. The reward server computer may be a credit card reward program such as offered by American Express where the user earns rewards based on purchases or an advertising based award program where the user earns rewards by selecting advertising content.

A user of this system may acquire and accumulate rewards through any prior art means such as shown on FIG. 1 of the '640 patent, which are then posted in a user's reward account 52 that is accessible through the reward server computer 10. The trading server computer 20 is in communication through the network 2 with a user on a user computer 40 and is additionally able to connect to the reward server computers 10, 12, 14 through the network 2 in accordance with techniques well known in the art for Internet communications. The merchant computer 30 is representative of any site that can communicate with the network that has goods or services for sale or trade. The merchant may have a direct relationship with the trading server where the direct relationship allows for a streamlined process for allowing a user to acquire products offered via the merchant computer. Alternatively, the merchant computer may be an independent merchant that does not currently have a profile defined in the trading server that will accept payment from another computer system in any one of well known e-commerce embodiments.

The rewarding entities may be any type of entity that has a service for allocating points or consideration for user actions. The reward server computers 10,12, 14 may be of any type of accessible server capable of holding data about a user along with a corresponding earned value that is negotiable for other goods, services, or points of another system. In the preferred embodiment, the airline reward server computer 10 may refer to one or several different airlines that have frequent flyer programs or the like. The credit card reward server computer 12 may refer to any type and number of credit card server systems capable of holding, increasing or decreasing a user's earned rewards acquired according to the terms of the credit card program to which the user has enrolled. The marketing reward server computer 14 may refer to one or a multitude of network accessible marketing systems that allow a user to have an account where points or other redeemable value may be stored, updated and redeemed by a user. The trading server computer may be any type of computer system that allows users to access the system in order to perform the processes involved in this invention. In the preferred embodiment all of the systems described are accessible through the Internet and the user may freely navigate to any site by means well known in the art.

The present invention allows issuers who originally sold reward points in their program for use as an incentive by third parties to repurchase points at a substantial discount, thereby reducing their liability and allowing for a trading strategy that enables points to continually be sold and repurchased. This may be a separate accounting procedure than what is used for points that are granted.

The method of allowing the user to redeem the accumulated reward points from one or more of a plurality of reward entities will now be described with respect to FIG. 4 and the data flow diagram of FIG. 6 of the '640 patent. The trading server system would allow users to "log in" to access the functionality provided where the user may interact with applications, forms or controls. For example, the user may view his account information by using a web browser to enter the appropriate identification information and then select buttons, links or other selectable objects to navigate to the part of the system desired. The user, from the user computer, makes a request to the trading server computer 20 at step 102, requesting redemption through the network 2 for a portion of the pre-accumulated reward points stored for the user in one of the rewarding entities. A user reward account 52 is associated with each of the reward servers but is only shown in FIG. 4 connected to the airline server for sake of clarity. The user may interactively select rewards to be redeemed, or the system may determine which rewards are to be redeemed based on a previously defined user profile rule. The trading server computer 20 "obtains" the reward points from a reward server 10, 12, 14 stored in the user's account 52 by contacting the appropriate reward server at step 110 according to the user's requirements, by using the connection parameters as defined in a database 54 on the trading server as shown in FIG. 5 of the '640 patent. In one embodiment, the trading server retrieves reward account balance information at step 114 from the reward server for the user. In another embodiment, the trading server transfers as part of the communication 110, the requested reward mileage to be redeemed. The reward server computer 10 decreases the users reward account 52 by the requested number of reward points. The term point is used to reference any earned value that has a cash equivalent or negotiable worth as in "frequent flyer" point or mile. The reward server computer 10 conveys consideration to the trading server computer 20 where the consideration corresponds to the number of reward points decreased in the user's account 52 on the reward server 10. For example, the consideration may be in the form of a monetary credit to an account that exists between the trading server and the reward server, that gets paid at the end of a predefined billing cycle (i.e. every month). The trading server computer 20 increases the reward exchange account 54 associated with the user by the received number of points. The trading server computer 20 in turn, receives the consideration from the reward server computer 10.

In the second part of the transaction (see FIG. 7 of the '640 patent), the user from a user computer 40 may make a request 150 to purchase an item from an associated merchant computer 30. In the preferred embodiment, the merchant computer system will be a networked computer system accessible via the Internet. The user would visit the site by selecting on a link from the trading server's web site or by entering the name or address of the destination site. The user may identify one or many items to be acquired from one or several merchants 30. The trading server computer 20 would confirm that the user has sufficient points to purchase the selected item by checking the user's reward exchange account 54. The trading server computer 20 would request the merchant computer to deliver the item to the user. The user delivery information may be retrieved from the trading server computer 20 or may be supplied in some other manner. The trading server computer 20 would decrease the user exchange account 54 by the number of points corresponding to the purchased item. The trading server computer 20 conveys consideration to the merchant computer 30 equivalent to the cost of the item by means well known in the art of electronic commerce (eg. by a preexisting account, credit card, etc.) In the alternative, the consideration may be a direct transfer of points to an account associated with the merchant.

Policies and profiles may be established to automatically contact each of the reward servers according to a user redemption profile (see FIG. 5 of the '640 patent) to transact the required payment for an item selected by a user. This profile may indicate the order of redemption and method of providing funds sufficient to cover the purchase after redeemable points are exhausted. For example, if a user has a preferred air carrier where the user would like to retain mileage in that reward system, the user may specify a priority of use indicating the reward resources that should be exhausted prior to accessing the most desirable rewards. Following the selection of an item to be acquired, the server may contact all of the reward resources according to this profile to selectively redeem each as required to meet the purchase price. The process may be performed in real time or as a background process where the user may select how the transaction should proceed. If the user exhausts lower personal worth resources from the reward servers, the system may be required to contact the user before the transaction is allowed to proceed to redeem points. A classification system may also be used to indicate rewards of similar worth. If for instance, a frequent flyer program supports multiple classifications of miles that may be redeemed differently, the user may optionally define how those resources should be managed during redemption. The redemption process would then honor those rules elected by the user to select from several different reward programs instead of redeeming rewards strictly on a value required from the first reward program contacted.

FIG. 8 of the '640 patent describes the process steps involved in enrolling a user to utilize the trader server. The data entered by the user may be used in determining whether a user allows unsolicited offers to be presented from the trading server. The user's preferences for manufactured goods services, products, travel destinations, hobbies, interests or any other user entered criteria may be stored in the database for subsequent use by the system. The trading server has the ability to receive offers from reward servers or merchants which may then be directed to users based on the database profile information provided by the user (see FIG. 9 of the '640 patent).

The trading server may also be contacted in response to a button or hyperlink located on a web page accessible by the user from the airline reward server. In a similar manner, hyperlinks or calling routines may allow a user to access a reservations system or merchant from the trading server. The link would direct the user to partner or associated air carriers where the points in a user exchange account on the trading server 20 may be used to acquire reduced fare flights.

The system used to implement the aforementioned method will now be disclosed with respect to FIG. 5 of the '640 patent. The system is comprised of a trading server computer connected to a network of computers where a user interface is established whereby a user from a user computer may access the server to request the transaction to contact a reward server computer system. In the preferred embodiment, the server has memory means for storing the user account information, user profiles and rules specified by the user, system, or merchant. The trading server also has communications means to allow users to access the server and to allow the trading server to contact reward servers and processing means to interpret the rules and coordinate the contact to the respective reward servers. The processing means is adapted to allow the user to request and exchange consideration for rewards from reward servers. The processing means additionally is adapted to coordinate the exchange of consideration and increase or decrease the user exchange accounts stored in memory in response to actions performed by the user computer, reward server and merchants.

In the preferred embodiment, the memory means comprises a database structure that is used to record the transactions associated with the previously described method. Records indicating the changes and current value of user exchange accounts are updated according to the request processed by the processor.

In response to a request for redemption, the trading server looks up the contact properties of the reward server to be contacted. The user information is submitted to the reward server to display the available points that may be redeemed. In another embodiment, the request additionally contains a value to be redeemed. The processor establishes a communication link with the reward server and a transaction request is sent to the processor of the reward server. The processor of the reward server may perform actions that may allow or refuse the requested action. In another embodiment, the trading server processor may be granted direct authorization to modify the user's records in the reward server database without analysis by the processor of the reward server. A conversion rate may be applied to the transaction such that the reward server reduces the available rewards in the user's account. The reward server then transfers consideration to the trading server that corresponds to the value reduced in the reward system. In response to the receipt of the transfer or approval of the transfer, the trading server increments the user account balance to reflect the received consideration and the connection to the reward server is dropped. A transaction log may be used to record each of the transactions in case a reconciliation process is required at a later time. The increase in the user's exchange account may then be stored until a user finds an item to be purchased.

The user selects the desired object from the merchants by indicating the type of product or service to be procured. In one embodiment, the trading server contacts the merchant server to return to the user a list of products that match the user's search criteria or if the user had specified in detail what was desired, the product may be directly acquired from a merchant. A communication link is established between the trading server and the merchant computer or designee for e-commerce. Direct acquisition may be enacted by contacting the merchant computer and supplying the user indicia, the product indicia, and the redemption value sufficient to secure the transaction. In response to the transaction request, the merchant computer will receive the consideration supplied and contract for the delivery of the product. In another embodiment, the consideration required for the item selected is sent to the trading server where based on the available points in the user's exchange account the trading server will determine whether the consideration is available. An authorization process may be incorporated at this point to request authorization from the user or in a more simplified process, the consideration will be transferred to the merchant computer and the user's exchange account will be reduced. The merchant computer will receive the consideration and will effectuate a delivery transaction to be issued.

The goods may also be placed under direct control of a distribution arm of the trading service so that the user places the order with the trading service directly and the merchants are not directly involved with the sale of the goods.

Thus, the present invention provides a liability management system for issuers of reward points, which allows them to take points off the books and eliminate them, if desired, at a discount rate. This system enables the sale or repurchase of points with a trading strategy in which points need not expire.

The present system may be implemented by means of a smart card wherein frequent use points may be accumulated on the user's card every time the card is used for associated application. For example, if a user uses his smart card to pay for a hotel that normally gives reward points, those reward points may be stored on the smart card. Likewise, when the card is used for the purchase of an airline ticket, the points would be added to the smart card. The user may then redeem the accumulated reward points by inserting the card into a vender associated with a computer connected to the Internet. The trading process proceeds as described above, except that the points are obtained directly from the smart rather than a reward server.

The user may have a credit card, debit card, or stored value card that is linked to their points account in such a way as to permit them to pay for purchases with a merchant by using the card, wherein the merchant uses the existing credit card payment infrastructure as if payment were being made/authorized by a bank linked to the credit card or debit card account, but in fact the card is linked to the user's points account. In this manner, the user and merchant can use the points account to pay for purchases in a seamless manner whereby points are used for consideration rather than or as a supplement to cash and traditional credit.

Other aspects of this invention will now be disclosed that will enhance the reader's understanding of the application of this invention.

The user can purchase points from the system, borrow points from the system, etc., and basically treat the points as cash consideration for purposes of such transactions.

The system can prioritize the order of points being traded based on a predetermined set of rules such as in higher value points being issued before those with a lower value.

Merchandisers also benefit from the use of this system where another marketing channel is afforded for products that are often purchased by frequent travelers with high disposable income. Products and services encompassing jewelry, flowers, limousine transport, timeshare rental may be exchangeable for points stored in this system. Items purchased through the system may also be paid for by a combination of points and currency which might be the case when a user does not have enough accrued points to meet the purchase consideration of an item selected.

It is anticipated that high quality limited access products may benefit from the distribution methods afforded by this system. For example, companies like DeBeers and Chanel may take advantage of this distribution means without impacting the level of quality or excellence associated with their products.

Manufacturers can discount or liquidate goods for points in a manner that doesn't negatively affect the perceived value of the goods (i.e. not in direct competition with the mainstream sales). That is, the manufacturer can place overstocked, end of run type goods and the like, place them in the chain of distribution for exchange with points, and not be in direct competition with cash sales of its mainstream products.

Resort destinations that are managed by property management companies such as RCI may be integrated into this system where instead of trading accommodations with only those having similar property, it is now possible that the rental of the property may be achieved by conversion for points.

Offers may be distributed to users of this system where substantial rebates or reduced rates are described in the offer. Time sensitive product offerings can also be accommodated in the system where the value of the product is decreased according to a life span of the product. Time sensitive product offerings such as food products or concert tickets can have an associated diminishing or escalating value based on the length of the offer.

Using this system it is now possible to coordinate the products of several different providers into one package. A user of this system may therefore select an airline, hotel, car rental and Broadway show tickets in New York, individually or in a prepared package from one location by trading points where the package may not have existed before where the trading system coordinates all aspect of the transaction and reduces the user's exchange rewards in a corresponding manner.

Other purchasing leverage not specifically addressed previously may also be acquired by combining the power of a pool of high profile users of this system where these users may be allocated access to products or services not generally distributed to the remainder of the system users. Points collected in the system by these users may afford them access to limited distribution channels where higher discount levels or premium luxury products may be acquired. Direct access to cartel products such as diamonds, duty free items and other restricted access product or service offerings are also accommodated through the coordination of the trading server with these specialized service and product providers. For example, a preferred client distribution channel such as found in a European market for luxury goods would be made available to users of this system where the prices for the objects in this preferred channel may be significantly lower than retail for objects that are typically reserved for limited distribution at premium prices. The trading server may additionally have exclusive rights to allocate access to certain premium products, services, events, travel destinations or accommodations in accordance with any right or grant permitting such allocation to any user of the system. A distribution channel may make available exclusive products for all or a limited amount of the members of the system where the trading server system controls access to the offer. Parameters associated with the available quantity, duration, exchange rates, etc may be input into the system to be used in the allocation algorithm to restrict the offer. Upon user access, the trading server would, in these cases, modify the premiums offered to reflect the immediately attainable items for the current user and may additionally display or provide access to premiums that may be acquired through payment by other means (i.e. cash, charge, debit) to make up the difference between the user's available points and the points required to accept the offer.

In another embodiment of this invention, airlines seeking to provide higher levels of personalized service for their business travelers will provide access to the Internet or access to in-flight services such as video games, for a fee or in place of granting mileage rewards on transcontinental or transatlantic flights. Access to video games may be afforded to the traveler where the availability of different games depends on the number of reward points traded in by the traveler. The rewards may be converted using the trading server of this invention, where the user may opt to forego collecting mileage in return for accessing on-board entertainment provided in a standalone mode or in a linked mode. For example, users may select to play video games, access the Internet or utilize Email via a seatback or tray table mounted interface and controller. The user may optionally connect a laptop computer to an interface port of the aircraft using an Ethernet, parallel, USB connection or proprietary connector provided by the air carrier. In the preferred embodiment, the user would select the connection speed and type for communications based on whether in-flight or external services were to be accessed. Other types of business services may additionally be used and accounted for, such as using network printers or fax equipment. RF, satellite or microwave based communications may be used for real time communications where sufficient geographical coverage is provided.

The interface would allow a user to login using the frequent flyer account information or preferably, the trading server account login id and password, where the user may use points awarded from another air carrier or point server to "pay" for the services accessed. The account balance from the trading server may be transferred to the local controller prior to takeoff for each user that logs in to the trading server. Once the plane has departed, depending on the linking or access capability afforded by the air carrier or service provider, the user's account may be modified in real time or upon reconnection following landing, based on services selected by the traveler. If a real time link is supported, the user's exchange account may be periodically debited according to the services selected and duration of use.

In another aspect of the invention, an electronic bartering system is implemented, wherein product manufacturers, producers, distributors, etc. can provide surplus or overstocked goods for liquidation into the chain of supply of the system and exchange then for points as described herein. This provides an inventory management and liquidation system for these manufacturers and sellers.

In addition, the value of the reward points may fluctuate as a function of the company's performance, which may be measured by reference to the price of its stock, revenue, earnings, or some other parameter that is agreed to that reflects the relative performance of the company. In this manner, companies that perform well would provide an additional incentive to a user for using their frequent use program rather than a competitor's program. For example, all other parameters being the same, a user would likely choose the Acme credit card company over the Beta credit card company when the user determines that the Acme company performance results in a 10% increase in the number of points otherwise earned by using its credit card. The value may also fluctuate as a function of the number of points outstanding or the desirability of the issuer to reduce its liability or make it more robust.

What is claimed is:

1. A method for making a donation to a third party comprising the steps of:
   a. a user executing a purchase transaction by using a card with a point of sale device, the card linked to a user card account and a user reward point account, the user card account and the user reward point account being associated with the user and stored on an issuing bank computer, the user reward point account storing reward points previously accumulated by the user as a result of a previous transaction;
   b. a transaction processing device processing the transaction with the issuing bank computer by requesting authorization of the purchase transaction from the issuing bank computer and determining the quantity of reward points stored in the user reward point account on the issuing bank computer;
   c. the transaction processing device instructing the point of sale device to display (i) the quantity of reward points determined to be stored in the user reward point account on the issuing bank computer and (ii) a query to the user if a donation of reward points from the user reward point account is desired to be made by the user to a third party;
   d. if the user indicates that a donation of reward points is to be made to a third party, then executing a transfer from the user reward point account to a designated third party as a donation to the third party by reducing the number of reward points in the user account and transferring a corresponding value to an account associated with the third party.

2. The method of claim 1 wherein the value transferred to an account associated with the third party comprises a monetary value that is deposited to a monetary account associated with the third party.

3. The method of claim 1 wherein the value transferred to an account associated with the third party comprises reward points that are deposited to a reward account associated with the third party.

4. The method of claim 1 wherein the reward points previously accumulated by the user as a result of a previous transaction comprise reward points that are earned by the user as a result of executing a previous purchase transaction with the card.

5. The method of claim 1 wherein the reward points previously accumulated by the user as a result of a previous transaction comprise reward points that are aggregated by the user from one or more different reward point accounts.

6. The method of claim 1 wherein the point of sale device is a web site associated with the purchase transaction that is executed over the Internet by the user.

7. The method of claim 1 wherein the point of sale device is a telephone set associated with the purchase transaction executed by the user.

8. The method of claim 1 wherein the point of sale device queries the user for an amount to be donated.

9. The method of claim 8 wherein the user enters the amount to be donated into the point of sale device.

10. The method of claim 1 wherein the amount to be donated is a default amount previously indicated by the user.

11. The method of claim 10 wherein the user has the option of overriding the default amount and entering a different amount for that particular transaction into the point of sale device.

12. The method of claim 1 wherein the point of sale device queries the user for an identification of the third party to which the donation will be made.

13. The method of claim 12 wherein the user enters the identification of the third party to which the donation will be made into the point of sale device.

14. The method of claim 1 wherein the identification of the third party is a default identification previously indicated by the user.

15. The method of claim 14 wherein the user has the option of overriding the default identification and entering a different identification for that particular transaction into the point of sale device.

16. The method of claim 1 wherein the third party is an individual.

17. The method of claim 1 wherein the third party is a charitable organization.

18. The method of claim 1 further comprising the user donating reward points earned as a result of the purchase transaction to the third party.

19. A method for a transaction processing device to facilitate a user making a donation to a third party comprising the steps of:
   a. the transaction processing device receiving a request from a point of sale device to process a purchase transaction by a user using the point of sale device with a card, the card linked to a user card account and a user reward point account, the user card account and the user reward point account being associated with the user and stored on an issuing bank computer, the user reward point account storing reward points previously accumulated by the user as a result of a previous transaction;
   b. the transaction processing device processing the transaction with the issuing bank computer by requesting authorization of the purchase transaction from the issuing bank computer and determining the quantity of reward points stored in the user reward point account on the issuing bank computer;
   c. the transaction processing device sending an instruction to the point of sale device to display (i) the quantity of reward points determined to be stored in the user reward point account on the issuing bank computer and (ii) a query to the user if a donation of reward points from the user reward point account is desired to be made by the user to a third party;
   d. the transaction processing device receiving an instruction from the point of sale device indicating that the user indicates that a donation of reward points is to be made to a third party,
   e. the transaction processing device executing a transfer from the user reward point account to a designated third party as a donation to the third party by reducing the number of reward points in the user account and transferring a corresponding value to an account associated with the third party.

20. The method of claim 19 wherein the value transferred to an account associated with the third party comprises a monetary value that is deposited to a monetary account associated with the third party.

21. The method of claim 19 wherein the value transferred to an account associated with the third party comprises reward points that are deposited to a reward account associated with the third party.

* * * * *